UNITED STATES PATENT OFFICE.

BENIE A. BARNES, OF ARKANSAS CITY, KANSAS, ASSIGNOR OF ONE-HALF TO CHAS. W. EARLY, OF ARKANSAS CITY, KANSAS.

COMPOSITION FOR CLEANING AND POLISHING.

1,340,747.  Specification of Letters Patent.  Patented May 18, 1920.

No Drawing.  Application filed October 13, 1919. Serial No. 330,469.

*To all whom it may concern:*

Be it known that I, BENIE A. BARNES, a citizen of the United States, residing at Arkansas City, in the county of Cowley and State of Kansas, have invented a new and useful Composition for Cleaning and Polishing, of which the following is a specification.

This invention relates to a composition of matter for use in polishing furniture, automobile bodies and the like, one of its objects being to provide an inexpensive and efficient composition of matter which can be used easily and which will produce a high polish, at the same time cleaning the surface to which it is applied.

With the foregoing and other objects in view, the invention consists of the following ingredients substantially in the proportions stated:

| | |
|---|---|
| Paraffin oil | 3 qts. |
| Water | 15 oz. |
| Denatured alcohol | 15 " |
| Banana oil | 3 " |
| Green fruit coloring | ¼ " |

The ingredients are thoroughly mixed and the composition is used by applying same to the surface using for that purpose a soft cloth. The composition is thoroughly rubbed over the surface, cleaning any dirt therefrom, and producing a high polish.

Instead of using 15 ounces of denatured alcohol in the composition, 30 ounces of grain alcohol may be employed.

What is claimed is:

A composition of matter for use in cleaning and polishing furniture and the like, including paraffin oil, three quarts, water, 15 ounces, banana oil, 3 ounces, coloring matter, one quarter of an ounce, and alcohol not less than 15 ounces.

In testimony that I claim the foregoing as my own, I have hereto affixed my signature.

BENIE A. BARNES.